July 31, 1956 T. E. BRINTON 2,756,702
FERTILIZER DISTRIBUTOR
Filed Oct. 6, 1952 3 Sheets-Sheet 1
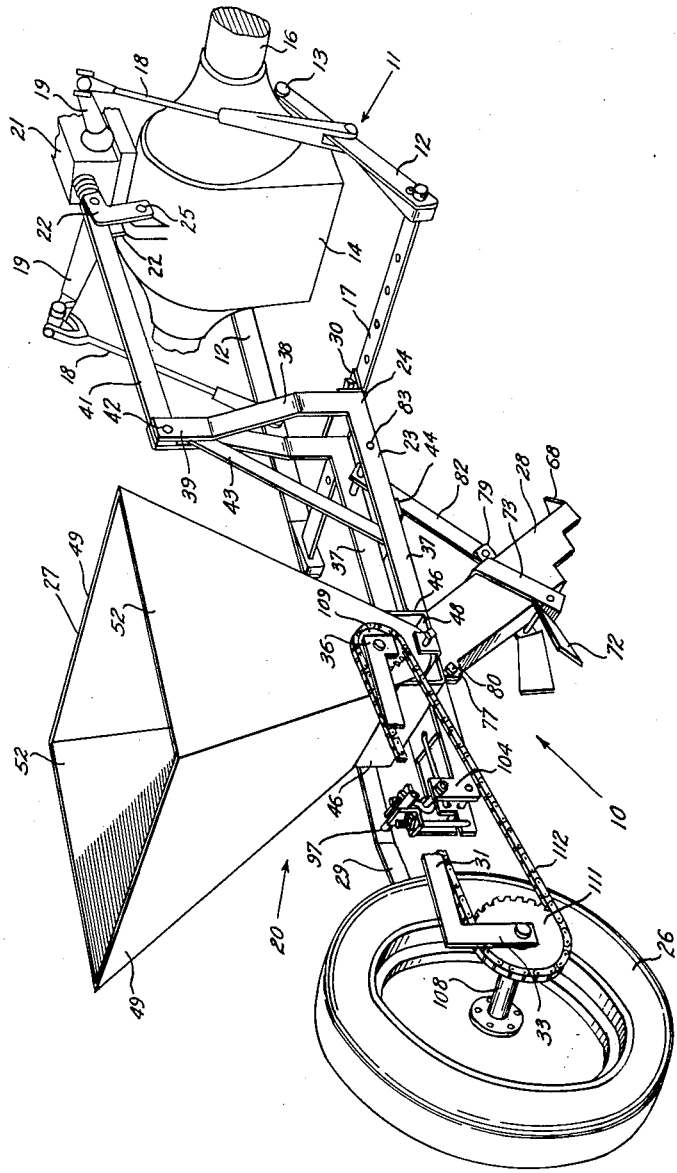
INVENTOR.
THOMAS E. BRINTON
BY
ATTORNEY.

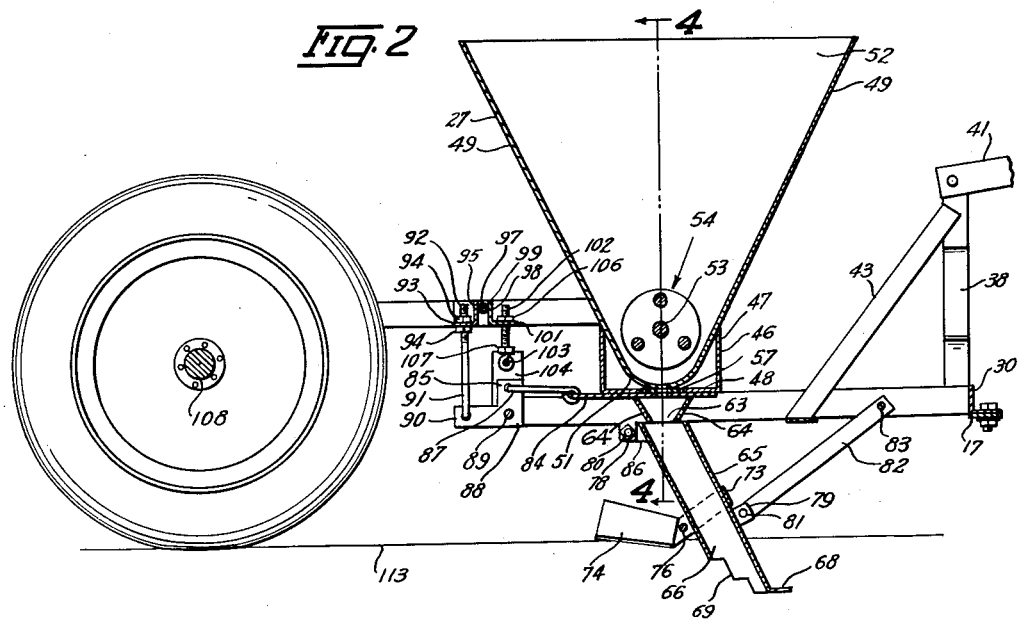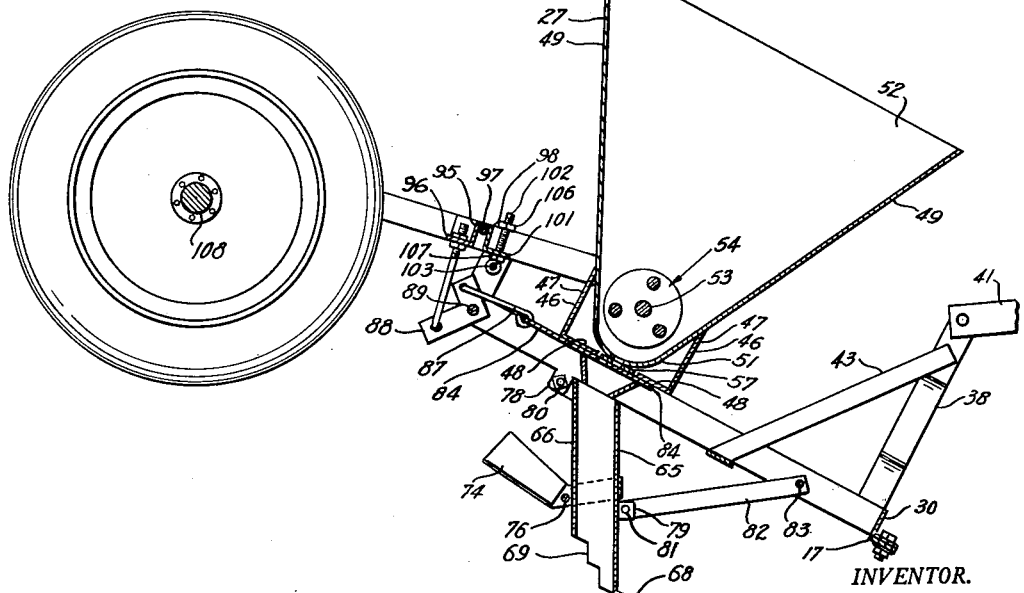

July 31, 1956 T. E. BRINTON 2,756,702
FERTILIZER DISTRIBUTOR
Filed Oct. 6, 1952 3 Sheets-Sheet 3

INVENTOR.
THOMAS E. BRINTON
BY
ATTORNEY.

United States Patent Office 2,756,702
Patented July 31, 1956

2,756,702

FERTILIZER DISTRIBUTOR

Thomas E. Brinton, Cedar Falls, Iowa

Application October 6, 1952, Serial No. 313,334

3 Claims. (Cl. 111—67)

This invention relates generally to fertilizer distributing machines and more particularly to a tractor drawn machine for distributing a nitrogen fertilizer which includes apparatus for automatically shutting off the supply of fertilizer being applied to the ground when the tractor is being turned about at the end of a field being fertilized.

An object of this invention is to provide an improved machine for distributing fertilizer.

A further object of this invention is to provide a fertilizer distributor having means for stopping the flow of fertilizer from the distributor to the ground at any desired time in a fertiliazing operation and while the distributor is being advanced, without effecting in any way a previously adjusted fertilizer flow.

Another object of this invention is to provide a fertilizer distributor adapted to be supported on the power lift of a tractor for towing by the tractor and which includes structure for stopping the flow of fertilizer to the ground when the distributor is lifted off the ground by the tractor power lift.

A further object of this invention is to provide a fertilizer distributor, adapted to be towed by a tractor, which includes a ground engaging wheel pivotally connected by means of an arm to the frame and hopper unit of the distributor and a gate structure responsive in movement to a pivotal movement of the arm for starting and stopping the flow of fertilizer from the distributor to the ground.

A still further object of this invention is to provide a fertilizer distributor which is economical to manufacture, rugged in construction and readily operable to start and stop a controlled supply of fertilizer to the ground.

Further objects, features and advantages of this invention will be apparent from a consideration of the following description when taken in connection with the accompanying drawings in which:

Fig. 1 is a perspective view of the fertilizer distributor of this invention shown in assembly relation with the power lift of a farm tractor;

Fig. 2 is a longitudinal sectional view as seen along the line 2—2 in Fig. 6;

Fig. 3 is a view illustrated similarly to Fig. 2 with the fertilizer distributor shown in its elevated inoperative position in which the supply of fertilizer is shut off.

Figure 4:
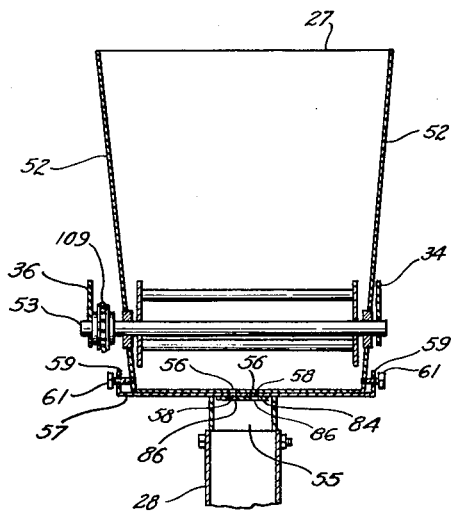
Fig. 4 is a sectional view looking along the line 4—4 in Fig. 2.

With reference to the drawing, the fertilizer distributor of this invention, indicated generally as 10, is shown in Fig. 1 in assembly relation with a tractor hydraulic power lift 11 of the well known "Ferguson" type.

This type power lift 11 includes a pair of transversely spaced arms 12 extended rearwardly from the tractor and pivotally connected at their front ends, by a pair of pivots 13, to opposite sides of the differential housing 14 carried on the tractor rear axle 16. Connected between the rear ends of the arms 12 is a draw bar 17. A pair of upright lifting arms 18 have their lower ends pivotally connected to the arms 12, and their upper ends operatively connected with a crank arm 19 rotatably supported in a portion 21 of the tractor frame. A pair of spaced apart rocker arms 22 are pivoted at 25 to the top side of the differential housing 14. The crank arm 19 is operatively associated with a power mechanism (not shown) for raising and lowering the arms 18.

The distributor 10 consists of a frame and hopper unit 20 which includes a hopper 27 carried on a main frame 23. The main frame 23 is attached at its front end 24 by means of an angle iron 30 to the draw bar 17 and supported at its rear end by a ground engaging wheel 26. The fertilizer hopper 27 is carried on the top side of the frame 23 intermediate the front and rear ends of the frame 23 so as to extend upwardly from the frame 23. A downwardly projected furrowing blade or shoe 28 which receives fertilizer from the hopper 27 is secured to the frame 23 at a position directly beneath the hopper 27. A pair of wheel supporting arms 29 and 31 which carry the wheel 26 between their rear ends 32 and 33, respectively, are pivotally supported at their front ends 34 and 36, respectively, at transversely opposite sides of the hopper 27.

The main frame 23 includes a pair of transversely spaced longitudinal frame members 37 having upwardly extended front end sections 38. The end sections 38 are inclined toward each other and receive between their upper ends 39 the rear end of a bar 41 pivotally attached at its front end between the spaced apart rocker arms 22 of the tractor power lift 11. A pivot member 42 is extended through the upper ends 39 of the front end sections 38 and the rear end of the bar 41. Also secured, as by welding, between the ends 39 of the front end sections 38 and below the pivot member 42 is the upper end of an inclined brace member 43, the lower end of which is secured to a cross brace 44 extended between the frame members 37.

A pair of longitudinally spaced apart transverse L-shape or angle plates 46 (Figs. 2 and 3) have horizontal legs 48 extended toward each other and mounted on the top side of the frame members 37 intermediate the ends thereof, and vertical legs 47 projected upwardly from the frame members 37. The upper ends of the vertical legs 47 are secured to the inclined front and rear walls 49 of the hopper 27, which is positioned such that its curved bottom portion 51 extends downwardly between the vertical legs 47.

The hopper 27 includes the upwardly and outwardly inclined front and rear walls 49 and a pair of upwardly and outwardly inclined side walls 52 secured to and extended between the walls 49. An agitator 54 has a horizontally disposed shaft 53 journalled in the side walls 52 adjacent the lower ends thereof so as to be rotatable within the hopper 27 in a substantially concentric relation with the curved bottom portion 51 of the hopper.

The lower side of the curved portion 51 of the hopper 27 has a pair of feed openings 56 spaced axially of the shaft 53 and communicating with the space 55 formed between the main frame members 37 (Fig. 4). A horizontal regulating gate valve 57 is positioned on the frame members 37 between the horizontal legs 48 of the L-shape members 46 for sliding movement transversely of the frame members 37. Formed in the gate valve 57 are a pair of longitudinally spaced feed openings 58, which are movable into and out of registration with the hopper openings 56 in response to the sliding movement of the gate valve 57. The gate 57 is formed at its ends with upwardly projected sections 59 arranged outwardly of the oppositely disposed hopper side walls 52. A threaded bolt member 61 extends through a threaded opening in each section 59 into contact with the adjacent hopper wall 52. Thus the degree of registration of the gate openings 58 with the hopper feed openings 56 is adjustable by manipulation of the bolt members 61. Further, the gate 57 is maintained against accidental movement relative to the hopper 27 by virtue of the gate 57 being clamped by the bolts 61 to the hopper side walls 52.

A pair of plates 64 inclined downwardly toward each other are secured to and extended between the frame members 37 to form an open bottom through 63 below the openings 56 and 58. The lower end of the trough 63 communicates with the interior of the hollow furrowing blade or shoe 28 which is carried by the frame members 37, such that the upper end of the shoe 28 is disposed immediately below the trough 63.

Figure 5:
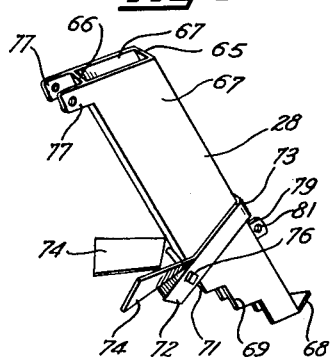
Fig. 5 is a detail perspective view of the hollow furrowing blade or shoe which forms a part of the fertilizer distributor.

The shoe 28 includes an elongated tubular member of a rectangular shape in transverse section having a front wall 65, a rear wall 66 and a pair of side walls 67, with the front and rear walls 65 and 66 being of a lesser width than the side walls 67 (Fig. 5). Secured to the lower end of the front wall 64 so as to extend forwardly therefrom is a substantially triangular digger blade 68. To prevent the lower open end of the shoe 28 from being clogged with earth, the side walls 67, at their lower ends rearwardly of the digger blade 68, are of a step like construction 69 so that their rear edges terminate substantially above the level of the digger blade 68. The rear wall 66, along which part of the fertilizer from the hopper 27 flows, thus terminates at its lower end 71 on a level with the rear edges of the side walls so that the fertilizer is free to fall into the furrow plowed by the shoe 28. The shoe 28 thus constitutes a spout for directing fertilizer from the hopper 27 to the ground.

Mounted adjacent the lower end of the shoe 28 so as to project rearwardly therefrom is a furrow closing element 72. The element 72 includes a U-shape strap 73 positioned about the shoe 28 and terminating at its ends in a pair of rearwardly and upwardly extended blades 74 arranged in a rearwardly diverging relation. The blades 74 are also inclined downwardly and inwardly toward the furrow opened by the shoe 28 and function to direct the earth thrown outwardly by the shoe 28 back into the open furrow. A bolt 76 extended through the legs of the strap 73 at a position rearwardly of the rear wall 66 of the shoe 28 clamps the furrow closing element 72 about the shoe 28.

For securing the shoe 28 to the main frame 23, a pair of rearwardly extended lugs 77 are formed on the side walls 67 of the shoe 28 at the upper end thereof. The side walls 67 are a distance apart such that when the shoe 28 is secured to the frame members 37, the lugs 77 are arranged in a straddling relation with a pair of downwardly extended projections 78 formed on the corresponding frame members 37. A pivot 80 extended through the projections 78 and lugs 77 pivotally secures the shoe 28 to the main frame 23. A third lug 79, formed on the front wall 64 of the shoe 28 adjacent the lower end thereof, is pivotally connected by means of a shear pin 81 to the lower end of an upwardly and forwardly inclined supporting bar 82 (Figs. 2 and 3). The upper end of the bar 82 is carried on a pivot 83 secured to and extended between the frame members 37. Thus should the shoe 28 strike a submerged rock or other obstruction, the pin 81 will shear off to allow the shoe 28 to swing rearwardly about the pivot 80 in a clearance relation with the trough 63, to thereby preclude damage to the shoe 28 and the main frame 23.

Mounted for horizontal sliding movement longitudinally of the main frame 23 between the upper ends of the trough members 64 and the bottom sides of the horizontal legs 48 of the L-shape members 46, is a feed closure gate 84 of a width to fit between the frame members 37. A pair of openings 86 are formed in the gate 84 so that when the openings 86 are aligned with the hopper feed openings 56 and the feed adjusting gate openings 58, fertilizer is allowed to flow from the hopper 27 into the trough 63 and the shoe 28 (Fig. 4). In other words, when the fertilizer openings 56, 58 and 86 are in registration, they are positioned directly above the trough 63 and between the frame members 37.

Figure 6:
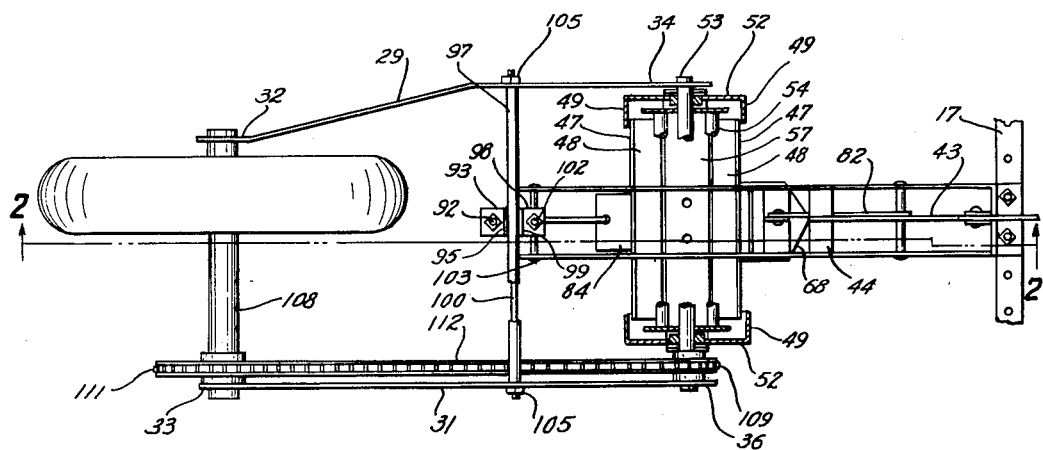
Fig. 6 is a top plan view of the fertilizer distributor with some parts removed and other parts broken away and shown in section for the purpose of clarity.

An actuating rod 87 is pivotally secured at its front end to the rear end of the closure gate 84 for moving the gate 84 between a position shutting off the flow of fertilizer from the hopper 27 to the shoe 28 and a position permitting such flow of fertilizer into the shoe 28. The rear end of the rod 87 is pivotally secured to one arm 85 of a bell crank 88 carried on a transverse rock shaft 89 extended between the frame members 37. The other arm 90 of the bell crank 88 is pivotally attached to the lower end of a vertically extended rod 91 secured at its upper end 92 to an angle bracket 93. A pair of locking nuts 94 are arranged on the threaded upper end 92 of the rod 91 to opposite sides of the rearwardly extended horizontal leg 96 of the angle bracket 93 to prevent movement of the rod 91 relative to the bracket 93. The angle bracket 93 has its vertical leg 95 welded to the rear side of a transverse tube or sleeve 97 extended between the wheel supporting arms 29 and 31. The sleeve 97 (Figs. 3 and 6) is carried on a rod 100 having its ends extended through the arms 29 and 31 and provided with nuts 105 so as to clamp the sleeve 97 between the arms 29 and 31. Thus the sleeve 97 and rod 100 hold the arms 29 and 31 in a predetermined space relation.

Similarly, an angle bracket 98 having a vertical leg 99 and a forwardly extended horizontal leg 101 has the back side of its vertical leg 99 welded to the front side of the sleeve 97. Extended through the horizontal leg 101 is a vertically extended threaded rod 102 pivotally mounted at its lower end on a rod 103 extended between a pair of upwardly extended sections 104 formed at the rear ends of the frame members 37. The rod 103 is arranged at a horizontal position substantially above the bell crank shaft 89 so as to be in a clearance relation with the bell crank 88. A nut 106 is mounted on the upright threaded rod 102 adjacent the upper end thereof while a similar nut 107 is mounted adjacent the lower end of the rod 102. Thus, the rod 102 is free to move vertically through the bracket leg 101 between stop positions defined by the engagement of the adjustable nuts 106 and 107 with the bracket leg 101.

The arms 29 and 31 are mounted at their rear ends 32 and 33, respectively, on an axle 108 for the ground engaging wheel 26 at opposite sides of the wheel 26. At their front ends 34 and 36, the arms 29 and 31 are pivotally carried on the opposite ends of the hopper agitator shaft 53 which ends extend outwardly from the side walls 52 of the hopper 27. Also carried at one end of the shaft 53 at a position between the arm 31 and the adjacent hopper wall 52 is a sprocket gear 109. A corresponding sprocket gear 111 is carried by the wheel axle 108 between the wheel 26 and the arm 31. Trained about the gears 109 and 111 is an endless chain 112 of a roller or link type for rotating the agitator shaft 53 in response to a rotation of the wheel axle 108, which is journalled in the rear ends 32 and 33 of the arms 29 and 31, respectively.

In the operation of the fertilizer distributor 10, assume that the distributor is in its operative position shown in Figs. 1 and 2 and that it is being moved upwardly by the power lift 11 to its inoperative position shown in Fig. 3.

During this upward movement of the distributor 10, as the main frame 23 is initially elevated, the frame members 37 are swung upwardly about the pivots 13 of the power lift 11 concurrently with an upward swinging movement of the arms 29 and 31 about the wheel axle 108. As a result of this upward swinging movement of the frame members 37 about the pivots 13, the frame member rear end sections 104 are progressively elevated at a faster rate than is the hopper 27 which is secured to the frame members 37 forwardly of the rear end sections 104. Since the front ends of the arms 29 and 31 are mounted on the shaft 53 carried by the hopper 27, the front ends of the arms 29 and 31, are also moved upwardly at a slower rate than the frame member rear end sections 104. Further, since the bracket members 93 and 98 carried by the arms 29 and 31 are positioned rearwardly of the front ends of the arms 29 and 31, and since the arms 29 and 31 swing upwardly about the wheel axle 108, the bracket members 93 and 98 move upwardly at a slower rate than the front ends of the arms 29 and 31. Thus during the elevation of the distributor 10, the frame member rear end sections 104 are moved upwardly toward the brackets 93 and 98.

By virtue of this upward movement of the sections 104 toward the bracket 93, the bell crank 88 is progressively rotated in a counter-clockwise direction, as viewed in Fig. 2 during the elevation of the distributor 10. This rotation of the bell crank 88 occurs as a result of its mounting on the shaft 89, which is carried by the frame member rear end sections 104, and the pivotal connection of the rearwardly extended arm 90 of the crank 88 to the lower end of the rod 91 carried by the bracket 93. Such rotational movement of the bell crank 88 moves the closure gate actuating rod 87 rearwardly to thereby move the closure gate openings 86 out of registration with the openings 58 in the adjusting gate 57 to shut off the flow of fertilizer from the hopper 27 to the shoe 28. It can thus be seen that the wheel 26 and the arms 29 and 31 constitute an actuating mechanism for sliding the closure gate 84 between its open and closed positions in response to the pivotal movement of the hopper and frame unit 20 about the pivots 13.

Also, during the upward movement of the frame members 37, the rod 102 carried by the frame member rear end sections 104 slides upwardly in the angle bracket 98. This movement of the rod 102 in the bracket 98 continues until the nut 107 mounted adjacent the lower end of the rod 102 contacts the bracket 98. Thus further movement of the frame member rear end sections 104 relative to the bracket member 98 is prevented by the contact of the nut 107 and the bracket member 98. As a result of the contact of the nut 107 and the bracket 98, further upward movement of the frame members 37 results in a lifting of the arm members 29 and 31 to raise the ground engaging wheel 26 off the ground. The distributor 10 is then elevated to its inoperative position shown in Fig. 3 in which the wheel 26 and the digger blade 68 are positioned above the ground surface 113.

To commence a fertilizing operation, the tractor power lift 11 is lowered until the wheel 26 is supported on the ground surface 113 (Fig. 2). During such lowering movement of the distributor 10, the wheel 26 first contacts the ground 113. Upon further lowering movement of the power lift 11, the frame member rear end sections 104 are moved downwardly relative to the brackets 93 and 98 carried by the wheel supporting arms 29 and 31. This relative movement occurs by virtue of the pivotal downward movement of the arms 29 and 31 about the wheel axle 108. The frame member rear end sections 104 therefore move downwardly relative to the bracket 98 until the nut 106 on the rod 102 carried by the rear end sections 104 contacts the bracket 98 (Fig. 2). Thus in the position of the distributor 10 shown in Fig. 2, in which the wheel 26 is supported on the ground surface 113, downward movement of the sections 104 relative to the wheel supporting arms 29 and 31 is prevented by the contact engagement of the nut 106 and the horizontal leg 101 of the bracket 98.

Concurrently with this downward movement of the rod 102 in the bracket 98, the bell crank 88, which is pivotally mounted on the shaft 89, is rotated clockwise, as viewed in Fig. 3. This rotation of the bell crank 88 is due to the pivotal connection of the arm 90 of the crank 88 to the lower end of the rod 91 which is adjustably secured at its upper end to the bracket 93 as previously described. Thus, upon downward movement of the sections 104 relative to the bracket 93, the rod 91 is moved upwardly relative to the bell crank shaft 89 to thereby rotate the bell crank 88 in a clockwise direction about its shaft 89. Clockwise rotation of the bell crank 88 moves the closure gate actuating rod 87, which is pivotally secured to the bell crank 88, to thereby slide the closure gate 84 to its open position shown in Fig. 2. In this position of the closure gate 84, the openings 86 therein are in registration with the adjusting gate openings 58 and the hopper feed openings 56. Thus, in the operative position of the fertilizer distributor 10 illustrated in Fig. 2, fertilizer is free to flow from the hopper feed openings 56 into the shoe 28. The flow of fertilizer from the hopper 27 is maintained at a predetermined rate depending on the extent of registration of the openings 58 in the gate 57 and the hopper feed openings 56, as controlled by the adjustment of the threaded members 61.

In the operative position of the distributor 10, the shoe 28 is disposed beneath the ground surface 113 so that as the distributor is towed through the field, the shoe 28 opens a furrow in the field (Fig. 2). Concurrently with the opening of this furrow by the shoe 28, fertilizer from the hopper 27 flows downwardly through the open bottom trough 63. The trough 63 directs the fertilizer into the shoe 28 which is inclined forwardly and downwardly so that fertilizer in the shoe 28 flows in part along the back wall 66 thereof. The fertilizer then drops off the lower end 71 of the back wall 66, which is positioned above the digger blade 68, into the open furrow. The inclined blades 74 which are projected rearwardly from the shoe 28 in a diverging relation then operate to close the furrow into which fertilizer has been dropped. The ground engaging wheel 26 which is positioned directly behind the shoe 28 rolls along over the earth moved into the open furrow by the blades 74 to thus pack the earth over the fertilizer.

When the end of the field is reached and the tractor and the distributor 10 must be turned around before applying another line of fertilizer, the tractor power lift 11 is operated to elevate the distributor 10 in a manner previously described. The elevated position of the distributor facilitates the turning of the tractor while maintaining the supply of fertilizer to the shoe 28 shut off. When the tractor has been turned around and the distributor 10 is lowered to its operative position, the flow of fertilizer from the hopper 27 to the shoe 28 takes place at a rate predetermined by the previous adjustment of the gate 57.

It is seen, therefore, that this invention provides a fertilizer distributor 10 adapted to be supported on the power lift 11 of a tractor for towing by the tractor. Upon operation of the power lift to elevate the distributor 10, the flow of fertilizer from the distributor to the ground is automatically shut off. In addition, the elevated inoperative position of the distributor 10 facilitates the maneuvering of the tractor so that the tractor may readily be turned around at the end of a field while the flow of fertilizer is discontinued. Further, the manually adjustable gate 57 is disposed between the hopper 27 and the closure gate 84 so as to provide for a resumption of a predetermined rate of flow of fertilizer from the hopper 27 to the ground when the distributor 10 is moved to its operative position.

Although the invention has been described with respect to a preferred embodiment thereof, it is to be understood that it is not to be so limited since changes can be made therein which are within the scope of the appended claims.

I claim:

1. A fertilizer distributor comprising a frame structure adapted to be attached at its front end to a portable lifting means, a hopper mounted on said frame structure, said hopper having a fertilizer feed opening therein, a feed closure gate mounted below said hopper for sliding movement on said frame structure, with said closure gate being operable to open and close said hopper feed opening, a ground engaging member positioned rearwardly of said hopper, an arm member pivotally attached at one end to said hopper and at the other end to said ground engaging member, a bell crank pivotally mounted on said frame structure, with said bell crank being connected at one end to said closure gate and at the other end thereof to said arm member such that on upward movement of said frame structure, said arm member is pivotally moved downwardly relative to said frame structure so as to actuate said bell crank to move said closure gate to close said hopper feed opening, and means secured to and extended between said frame structure and said arm member for limiting the downward pivotal movement of said arm member relative to said frame structure so that upon further upward movement of said frame structure, said arm member and ground engaging member are moved upwardly as a unit with said frame structure.

2. For use with a tractor, a fertilizer distributor comprising a frame and hopper unit adapted to be supported at its front end by the tractor for up and down movement relative to the tractor, said unit including a hopper having a fertilizer discharge opening therein, a closure gate movably mounted on said unit for movement between open and closed positions relative to said hopper discharge opening, a ground engaging member positioned rearwardly of said unit, a support structure for said ground engaging member pivotally attached at one end to said unit and at the other end to said ground engaging member for vertical pivotal movement of said support structure and said ground engaging member relative to said unit, link means adjustably mounted on said support structure and means connected to said closure gate actuated by said link means for moving said closure gate in response to said pivotal movement of the support structure and the ground engaging member, and means carried by said unit and engageable with said support structure for limiting the pivotal movement of said support structure between a pair of positions corresponding to open and closed positions of said closure gate.

3. A fertilizer distributor comprising a frame and hopper unit, said unit including a longitudinally extended frame structure adapted to be attached at its front end to a portable lifting means and a hopper mounted on said frame structure intermediate the ends thereof, said hopper having a fertilizer feed opening therein, a feed closure gate movably mounted on said unit and operable to open and close said feed opening, a ground engaging member arranged rearwardly of said unit, an arm member pivotally connected at one of its ends to said unit at a position intermediate the ends of the unit and at its opposite end to said ground engaging member for pivotal movement of the arm relative to said frame structure on lifting of said frame structure, a lever member pivotally mounted on said frame adjacent the rear end thereof, adjustable link means connecting said lever with said arm member at a position intermediate the ends of said arm member for pivotally moving said lever in response to pivotal movement of said arm relative to said frame structure and means connecting said closure gate with said lever for operating said closure gate on pivotal movement of said lever.

References Cited in the file of this patent

UNITED STATES PATENTS

| | | |
|---|---|---|
| 664,072 | Allen | Dec. 18, 1900 |
| 1,053,944 | Frantz et al. | Feb. 18, 1913 |
| 2,024,778 | Ray | Dec. 17, 1935 |
| 2,269,987 | Raney et al. | Jan. 13, 1942 |
| 2,319,737 | Johnson | May 18, 1943 |
| 2,332,713 | Hand | Oct. 26, 1943 |
| 2,410,937 | Harder | Nov. 12, 1946 |

FOREIGN PATENTS

| | | |
|---|---|---|
| 647,571 | Great Britain | Dec. 13, 1950 |